(12) United States Patent
Fendt

(10) Patent No.: US 10,953,764 B2
(45) Date of Patent: Mar. 23, 2021

(54) METHOD AND SYSTEM FOR CHARGING MOTOR VEHICLES AT PUBLIC CHARGING STATIONS

(71) Applicant: Conti Temic Microelectronic GmbH, Nuremberg (DE)

(72) Inventor: Günter Anton Fendt, Schrobenhausen (DE)

(73) Assignee: Vitesco Technologies Germany GmbH

( * ) Notice: Subject to any disclaimer, the term of this patent is extended or adjusted under 35 U.S.C. 154(b) by 243 days.

(21) Appl. No.: 16/073,068

(22) PCT Filed: Jan. 11, 2017

(86) PCT No.: PCT/EP2017/050470
§ 371 (c)(1),
(2) Date: Jul. 26, 2018

(87) PCT Pub. No.: WO2017/133869
PCT Pub. Date: Aug. 10, 2017

(65) Prior Publication Data
US 2019/0031037 A1    Jan. 31, 2019

(30) Foreign Application Priority Data

Feb. 1, 2016 (DE) .......................... 10 2016 201 491

(51) Int. Cl.
*B60L 53/60*        (2019.01)
*B60L 53/68*        (2019.01)
(Continued)

(52) U.S. Cl.
CPC .............. *B60L 53/60* (2019.02); *B60L 53/68* (2019.02); *G01C 21/20* (2013.01);
(Continued)

(58) Field of Classification Search
CPC ........................................................ H02J 7/00
See application file for complete search history.

(56) References Cited

U.S. PATENT DOCUMENTS 9,448,083 B2    9/2016 Loftus et al.
2011/0193522 A1  8/2011 Uesugi

FOREIGN PATENT DOCUMENTS

CN    104716706 A    6/2015
CN    106207290 A    12/2016
(Continued)

OTHER PUBLICATIONS

German Search Report for German Application No. 10 2016 201 491.9, dated Sep. 8, 2016, with partial translation—7 pages.
(Continued)

*Primary Examiner* — Robert Grant
(74) *Attorney, Agent, or Firm* — RatnerPrestia

(57) ABSTRACT

A method for charging a plurality of motor vehicles, in particular hybrid electric/electric vehicles, at a plurality of public charging stations, having the steps of: determining release times at which the respective charging stations are released for charging; determining arrival times at which the respective motor vehicles can arrive at the respective charging stations; calculating intervals of time between the respective determined release times and the respective determined arrival times as required waiting times for charging the respective motor vehicles at the respective charging stations; deciding, on the basis of the calculated waiting times, which of the charging stations will be approached by the respective motor vehicles for charging, with the proviso that an actual total waiting time, which forms a sum of actual waiting times for charging the respective motor vehicles at the respective charging stations, is minimized.

6 Claims, 2 Drawing Sheets

(51) Int. Cl.
*G01C 21/20* (2006.01)
*G01C 21/34* (2006.01)

(52) U.S. Cl.
CPC ...... *G01C 21/3453* (2013.01); *B60L 2240/72* (2013.01); *B60Y 2200/91* (2013.01); *B60Y 2200/92* (2013.01); *Y02T 10/70* (2013.01); *Y02T 10/7072* (2013.01); *Y02T 10/72* (2013.01); *Y02T 90/12* (2013.01); *Y02T 90/14* (2013.01); *Y02T 90/16* (2013.01); *Y02T 90/167* (2013.01); *Y04S 30/12* (2013.01)

(56) References Cited

FOREIGN PATENT DOCUMENTS

| | | | |
|---|---|---|---|
| DE | 102015203149 A1 | 8/2015 | |
| EP | 2894436 A1 * | 7/2015 | ............... B60L 53/65 |
| EP | 2894436 A1 | 7/2015 | |

OTHER PUBLICATIONS

International Search Report and Written Opinion for International Application No. PCT/EP2017/050470, dated Apr. 11, 2017—7 pages.
Chinese Office Action for Chinese Application No. 201780009287.6, dated Aug. 26, 2020, with translation, 19 pages.

* cited by examiner

METHOD AND SYSTEM FOR CHARGING MOTOR VEHICLES AT PUBLIC CHARGING STATIONS

CROSS REFERENCE TO RELATED APPLICATIONS

This application is the U.S. National Phase Application of PCT International Application No. PCT/EP2017/050470, filed Jan. 11, 2017, which claims priority to German Patent Application No. 10 2016 201 491.9, filed Feb. 1, 2016, the contents of such applications being incorporated by reference herein.

FIELD OF THE INVENTION

The following invention relates to a method and a system for charging a plurality of motor vehicles, in particular hybrid electric/electric vehicles, at a plurality of public charging stations.

BACKGROUND OF THE INVENTION

There are electrically chargeable motor vehicles, in particular hybrid electric/electric vehicles, the batteries of which, in particular traction batteries, can be charged by stationary public charging stations. For technical reasons, the operations of charging the motor vehicles at the charging stations generally take several hours.

On account of the long charging time and the currently restricted number of public charging stations, there are often traffic jams at the charging stations. This results in inefficient use of the motor vehicles. On the other hand, despite the currently restricted number of charging stations, some charging stations (for example on account of the position which is unfavorable to drivers) are rarely used. This results in inefficient use of the public charging stations.

SUMMARY OF THE INVENTION

An aspect of the present invention is a possible way of increasing the efficiency when using the electrically chargeable motor vehicles and the public charging stations.

A first aspect of the invention provides a method for charging a plurality of motor vehicles, in particular hybrid electric/electric vehicles, at a plurality of public charging stations.

According to the method, release times at which the respective charging stations are released for charging (of next motor vehicles) are determined. If the charging stations are not occupied by motor vehicles, the release times of these charging stations are, for example, the current time. If the charging stations are occupied by motor vehicles and are currently charging these motor vehicles, the corresponding release times are the times at which the respective motor vehicles will (presumably) have been completely charged.

According to the method, arrival times at which the respective motor vehicles can (presumably) arrive at the respective charging stations are also determined. The arrival times are calculated on the basis of the current time and the periods needed for the respective motor vehicles to be able to (presumably) arrive at the respective charging stations. The periods are calculated, in particular, on the basis of routes to be traveled on, possibly in conjunction with traffic situations and road signs on these routes, for example the speed limit.

According to the method, intervals of time between the respective determined release times and the respective determined arrival times are also calculated as required waiting times for charging the respective motor vehicles at the respective charging stations, for which the respective motor vehicles would have to wait for charging at the respective charging stations.

A decision is then made, on the basis of the calculated waiting times, as regards which of the charging stations will be approached by the respective motor vehicles for charging. In this case, the calculated waiting times are compared with one another and are used to determine a minimum required total waiting time of all motor vehicles at the respective charging stations. Those waiting times which form the minimum total waiting time are then selected. The assignments of the motor vehicles to the corresponding charging stations are determined and are used to determine the previously selected waiting times. The motor vehicles are then allocated to the corresponding charging stations of the same determined assignments and are charged by these charging stations.

An aspect of the invention is based on the knowledge that, in order to increase the economic and ecological efficiency when electrically charging motor vehicles, in particular hybrid electric/electric vehicles, each of the motor vehicles for charging is intended to arrive at one of the charging stations geographically remote from one another precisely when the corresponding charging station is currently available for charging. In the case of a multiplicity of motor vehicles to be charged and a comparatively small number of occupied or available charging stations, there is a need for an inter-operative solution (instead of a previously known isolated solution) in which the multiplicity of motor vehicles to be charged and all occupied and unoccupied charging stations geographically remote from one another are taken into account on the basis of a standard decision-making algorithm for assigning the motor vehicles to be charged to the respective charging stations. The motor vehicles and the charging stations therefore form a common network in which the motor vehicles and the charging stations regularly interchange data with one another and, as a result, the operations of charging the motor vehicles can be optimized with regard to the overall economic and ecological efficiency. As a result, the situation in which a plurality of motor vehicles approach the same (occupied) charging station for charging or one charging station or other charging stations remain(s) unused for a long time, which is the case in the known isolated solution, is intended to be/can be avoided.

Within the scope of an aspect of the invention, it was also recognized that the release times at which the respective charging stations are released for charging and the arrival times at which the respective motor vehicles can arrive at the respective charging stations are relevant to the inter-operative solution.

The method described above was provided on the basis of this knowledge.

The calculation of the waiting times for charging the respective motor vehicles at the respective charging stations, for which the respective motor vehicles would have to wait for charging at the respective charging stations, then provides the decision-making basis, on the basis of which and using a standard decision-making algorithm it is then possible to decide, with regard to the overall economic and ecological efficiency of the electrically chargeable motor vehicles and all charging stations, which of the motor vehicles should drive to which of the charging stations for charging in order to increase the efficiency.

In this case, the decision as regards which of the motor vehicles will approach which of the charging stations for charging is made with the proviso that an actual total waiting time, which forms a sum of actual waiting times of the electrically chargeable motor vehicles at the public charging stations which have actually been approached by the motor vehicles for charging and at which the motor vehicles are actually charged, is minimized.

The method described above therefore provides a possible way of increasing the efficiency overall when using the electrically chargeable motor vehicles and the public charging stations.

Energy requirements of the respective motor vehicles which are needed for the respective motor vehicles to approach the respective charging stations are preferably also determined. The determined energy requirements are then compared with one another. A decision is made, on the basis of the comparison result, as regards which of the charging stations will be approached by the respective motor vehicles for charging. In this case, the energy requirements are preferably calculated on the basis of the distances between the respective motor vehicles and the respective charging stations and the consumption values of the respective motor vehicles. The decision as regards which of the motor vehicles will approach which of the charging stations for charging is also made in this case with the proviso that an actual total energy requirement, which forms a sum of actual energy requirements which would be used by the motor vehicles to actually approach the corresponding charging stations, is minimized.

The determined energy requirements and the previously determined waiting times are preferably weighted and are subjected to a decision-making algorithm. Depending on the ecological or economic relevance, the energy requirements and the waiting times can be weighted differently. If the ecological relevance is higher than the economic relevance, the energy requirements can be given a higher weighting than the waiting times. Conversely, if the ecological relevance is lower than the economic relevance, the energy requirements can be given a lower weighting than the waiting times. The weighted energy requirements and the weighted waiting times are merged or summed in pairs to form respective decision-making base values according to the motor vehicles and the charging stations. A decision is then made in the ecological or economic respect, on the basis of these decision-making base values, as to which of the motor vehicles will approach which of the charging stations for charging.

Ranges of the respective motor vehicles are preferably also determined. The ranges are determined, for example, on the basis of the remaining states of charge of the traction batteries of the respective motor vehicles. A decision is made, on the basis of the determined ranges, as regards which of the charging stations will be approached by the respective motor vehicles for charging. The decision as regards which of the motor vehicles will approach which of the charging stations for charging is also made in this case with the proviso that the ranges of the respective motor vehicles suffice to approach the respective charging stations. The decisions with regard to the waiting times or the energy requirements are therefore made only when the respective charging stations can also be reached by the corresponding motor vehicles on the basis of their respective ranges.

Possible driving routes to destinations which have to be currently approached by the respective motor vehicles are also preferably determined. These driving routes are determined, for example, on the basis of the destinations input by drivers in conjunction with navigation data. A decision is then made, on the basis of the determined driving routes, as regards which of the charging stations will be approached by the respective motor vehicles for charging. The decision as regards which of the motor vehicles will approach which of the charging stations for charging is therefore also made with the proviso that the charging stations are on the determined driving routes of the respective motor vehicles or are at least in the vicinity of these driving routes. If one charging station or other charging stations is/are not on the determined driving routes or not close to the determined driving routes, these charging stations are not possible for the corresponding motor vehicles in the decision described above.

A further aspect of the invention provides a system for charging a plurality of motor vehicles, in particular hybrid electric/electric vehicles, at a plurality of public charging stations.

The system comprises a first determination arrangement which is set up to determine release times at which the respective charging stations are released for charging (of next motor vehicles).

The system also comprises a second determination arrangement which is set up to determine arrival times at which the respective motor vehicles can arrive at the respective charging stations.

The system also comprises a calculation arrangement which is set up to calculate intervals of time between the respective determined release times and the respective determined arrival times as required waiting times for which the respective motor vehicles would have to wait for charging at the respective charging stations.

The system also comprises a decision-making arrangement which is set up to decide, on the basis of the calculated waiting times (as described above), which of the charging stations will be approached by the respective motor vehicles for charging.

In this case, the system is a combination of previously listed arrangements which are arranged in a decentrally distributed manner in the charging stations and the vehicles as well as public or private company traffic control/service centers, for example coordination points for electrically charging hybrid electric/electric vehicles. In this case, these arrangements are used to carry out the method described above and therefore form a unit which constitutes the system mentioned above.

Advantageous configurations of the method described above, insofar as they are applicable to the system mentioned above, should also be regarded as advantageous configurations of the system.

BRIEF DESCRIPTION OF THE DRAWINGS

An exemplary embodiment of aspects of the invention is explained in greater detail below with reference to the accompanying drawing, in which.

DETAILED DESCRIPTION OF THE PREFERRED EMBODIMENTS

Figure 1:
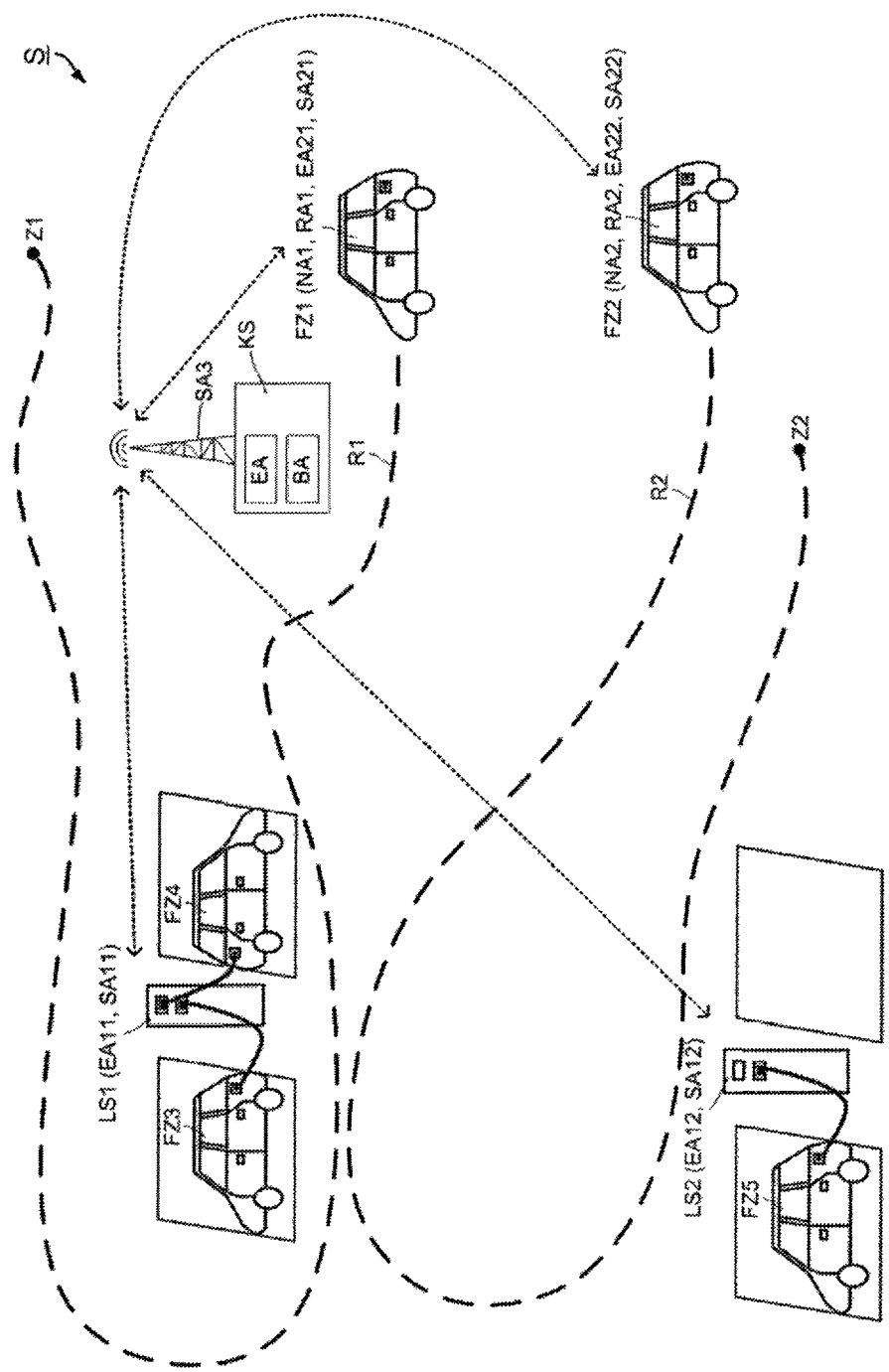
FIG. 1 shows a schematic illustration of a system for charging a plurality of electric vehicles at a plurality of public charging stations according to one embodiment of an aspect of the invention.

FIG. 1 shows a schematic illustration of two electric vehicles FZ1, FZ2 with corresponding driving routes R1, R2 to respective destinations Z1, Z2 to which the respective electric vehicles FZ1, FZ2 are soon intended to drive. The electric vehicles FZ1, FZ2 each comprise a navigation arrangement NA1, NA2 used to determine the respective driving routes R1, R2 to the respective destinations Z1, Z2.

FIG. 1 also shows two public charging stations LS1, LS2 on the driving routes R1, R2 of the two electric vehicles FZ1, FZ2, to which further electric vehicles FZ3, FZ4, FZ5 are electrically connected for charging.

The charging stations LS1, LS2 each have a charging pole with two charging connections, to which two electric vehicles FZ3, FZ4 can be simultaneously connected by means of a charging cable and can be charged. The charging stations LS1, LS2 each also comprise two parking spaces in which the electric vehicles FZ1, FZ2, FZ3, FZ4, FZ5 can be parked during charging.

The number of charging stations LS1, LS2 (as in reality) is in this case substantially smaller than the number of electric vehicles FZ1, FZ2, FZ3, FZ4, FZ5 which have to be charged using the charging stations LS1, LS2. If the charging stations LS1, LS2 are currently occupied by electric vehicles being charged, for example FZ3, FZ4, FZ5, and further electric vehicles arrive for charging, for example FZ1, FZ2, the following electric vehicles FZ1, FZ2 have to wait for a longer time until the electric vehicles FZ3, FZ4, FZ5 currently being charged have been completely charged.

On the other hand, a plurality of electric vehicles, for example FZ1, FZ2, may simultaneously arrive at one available charging station or other available charging stations, for example LS2, which may result in some of the electric vehicles, for example FZ1, FZ2, approaching unnecessarily.

In contrast to this, one charging station or other charging stations, for example LS2, may be available for a relatively long time because the electric vehicles, for example FZ1, FZ2, FZ3, FZ4, have unfavorably all approached the same (occupied) charging stations, for example LS1.

On the one hand, the existing resources are thus wasted. On the other hand, the operations of charging the electric vehicles FZ1, FZ2, FZ3, FZ4, FZ5 become inefficient with respect to the consumption of energy/time.

In order to counteract these disadvantages, a system S is provided and can be used to electrically charge the electric vehicles FZ1, FZ2, FZ3, FZ4, FZ5 in an energy-efficient and time-efficient manner using a limited number of charging stations LS1, LS2.

In this case, the system S is a combination of different, decentralized arrangements EA11, EA12, EA21, EA22, SA11, SA12, SA21, SA22, SA3, NA1, NA2, BA, EA which are to be described below and in turn are again arranged or designed in a decentrally distributed manner in the charging stations LS1, LS2 and in the electric vehicles FZ1, FZ2, FZ3, FZ4, FZ5 as well as in a central or decentralized coordination point KS for charging the electric vehicles FZ1, FZ2, FZ3, FZ4, FZ5, but are designed to carry out the same task, namely to charge the electric vehicles FZ1, FZ2, FZ3, FZ4, FZ5 in an economically and ecologically efficient manner.

The system S comprises first determination arrangements EA11, EA12 which are each arranged on one of the two charging stations LS1, LS2 and are set up to determine likely release times tf11, tf12; tf21, tf22 at which the respective charging connections of the respective charging stations LS1, LS2 are released for charging next electric vehicles. For this purpose, the first determination arrangements EA11, EA12 determine likely charging times on the basis of current states of charge of the respective motor vehicles FZ3, FZ4, FZ5 connected for charging and current charging powers.

On the basis of the current time and the likely charging time, the first determination arrangements EA11, EA12 then determine the respective likely release times tf11, tf12; tf21, tf22.

The system S also comprises range determination arrangements RA1, RA2 which are arranged in the respective electric vehicles FZ1, FZ2 and are set up to determine ranges of the corresponding electric vehicles FZ1, FZ2 in a manner known to a person skilled in the art on the basis of the states of charge of the traction batteries of the respective electric vehicles FZ1, FZ2.

The system S also comprises the above-mentioned vehicle navigation arrangements NA1, NA2 which are also set up to determine charging stations LS1, LS2 on the driving routes R1, R2 of the respective electric vehicles FZ1, FZ2, which can still be reached by the respective electric vehicles FZ1, FZ2 with the remaining charges.

The system S also comprises second determination arrangements EA21, EA22 which are arranged on the respective electric vehicles FZ1, FZ2 (FZ3, FZ4, FZ5) and are set up to determine likely arrival times ta11, ta12; ta21, ta22 at which the respective electric vehicles FZ1, FZ2 can arrive at the respective charging stations LS1, LS2.

The charging stations LS1, LS2 and the electric vehicles FZ1, FZ2 also each comprise a signal transmitting/receiving arrangement SA11, SA12; SA21, SA22, via which the charging stations LS1, LS2 and the electric vehicles FZ1, FZ2 can interchange data with one another and with the coordination point KS.

The coordination point KS comprises a corresponding signal transmitting/receiving arrangement SA3, via which the coordination point KS interchanges data with the charging stations LS1, LS2 and the electric vehicles FZ1, FZ2.

The system S also comprises a calculation arrangement BA and a decision-making arrangement EA which are arranged in the coordination point KS.

The calculation arrangement BA is set up to calculate intervals of time between the respective determined release times tf11, tf12; tf21, tf22 and the respective determined arrival times ta11, ta12; ta21, ta22 as required waiting times tw1, tw2, tw3, tw4, tw5, tw6, tw7, tw8 in a manner to be described below and to forward the calculated waiting times tw1, tw2, tw3, tw4, tw5, tw6, tw7, tw8 to the downstream decision-making arrangement EA.

The decision-making arrangement EA is set up to decide, on the basis of the transmitted waiting times tw1, tw2, tw3, tw4, tw5, tw6, tw7, tw8 and further decision-making bases to be described below, which of the charging stations LS1, LS2 should be approached by the respective electric vehicles FZ1, FZ2 for charging.

Figure 2:
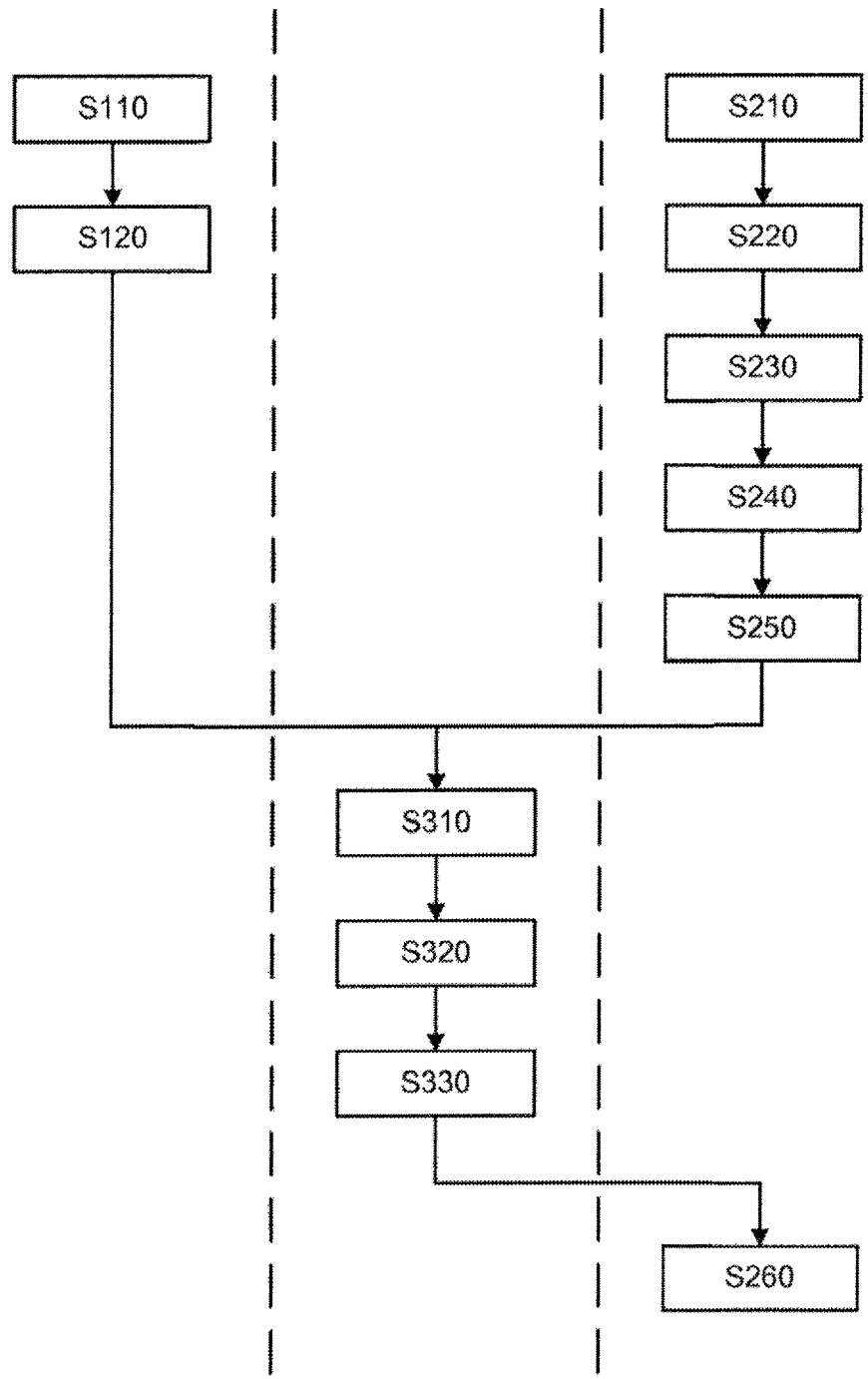
FIG. 2 shows a schematic flowchart of a method for charging the electric vehicles at the charging stations according to the embodiment in FIG. 1.

After the system S for charging the electric vehicles FZ1, FZ2, FZ3, FZ4, FZ5 has been described on the basis of FIG. 1, its method of operation is described in more detail below on the basis of FIG. 2:

According to a method step S110, the first charging-station determination arrangements EA1 of the respective charging stations LS1, LS2 regularly determine the release times tf11, tf12; tf21, tf22, in particular if the respective charging stations LS1, LS2 are occupied and are charging electric vehicles FZ3, FZ4, FZ5. In this case, the first determination arrangements EA1 determine the release times tf11, tf12; tf21, tf22 on the basis of the current time and the remaining charging times of the respective charging connections of the corresponding charging stations LS1, LS2.

According to a further method step S120, the charging stations LS1, LS2 then transmit data relating to the determined release times tf11, tf12; tf21, tf22 and possibly data relating to the coordinates, for example addresses, of the corresponding charging stations LS1, LS2 to the coordination point KS via the respective charging-station transmitting/receiving arrangements SA11, SA12.

Irrespective of this, according to a further method step S210, the vehicle range determination arrangements RA1, RA2 determine ranges of the respective electric vehicles FZ1, FZ2 at regular intervals of time, in particular if the states of charge of the respective traction batteries of the corresponding electric vehicles FZ1, FZ2 fall below a predefined state of charge threshold, on the basis of the states of charge of the respective traction batteries in a manner known to a person skilled in the art and forward the determined ranges to the respective downstream navigation arrangements NA1, NA2 of the corresponding electric vehicles FZ1, FZ2.

According to a further method step S220, the navigation arrangements NA1, NA2 determine, on the basis of the available previously determined driving routes R1, R2 and the obtained ranges, charging stations LS1, LS2, the coordinates or addresses of which are known to the navigation arrangements NA1, NA2 and which can still be reached by the respective electric vehicles FZ1, FZ2 with the respective remaining states of charge.

If the reachable charging stations LS1, LS2 have been found, the second vehicle determination arrangements EA2 determine, according to a further method step S230, arrival times ta11, ta12; ta21, ta22 at which the respective electric vehicles FZ1, FZ2 can arrive at the respective charging stations LS1, LS2 found (that is to say provided that said vehicles would approach the corresponding charging stations). The second determination arrangements EA2 determine the arrival times ta11, ta12, ta21, ta22 on the basis of the current time and likely journey times of the respective electric vehicles FZ1, FZ2 to the respective charging stations LS1, LS2, wherein the second determination arrangements EA2 determine the likely journey times on the basis of the navigation data from the navigation arrangements NA1, NA2 of the respective electric vehicles FZ1, FZ2 in a manner known to a person skilled in the art.

Furthermore, according to a further method step S240, the second determination arrangements EA21, EA22 determine, on the basis of the navigation data and in a manner known to a person skilled in the art, energy requirements which must probably be expended by the respective electric vehicles FZ1, FZ2 in order to reach the respective charging stations LS1, LS2 found.

According to a further method step S250, the electric vehicles FZ1, FZ2 then transmit data, for example addresses, relating to the charging stations LS1, LS2 found, data relating to the respective potential arrival times ta11, ta12; ta21, ta22 and data relating to the respective energy requirements to the coordination point KS via the respective vehicle transmitting/receiving arrangements SA21, SA22.

According to a further method step S310, the calculation arrangement BA of the coordination point KS uses the data obtained from the charging stations LS1, LS2 and the electric vehicles FZ1, FZ2 to calculate intervals of time between the respective determined release times tf11, tf12; tf21, tf22 and the respective determined arrival times ta11, ta12; ta21, ta22 as required waiting times tw1, tw2, tw3, tw4, tw5, tw6, tw7, tw8 for which the respective electric vehicles FZ1, FZ2 at the respective charging stations LS1, LS2 must wait until the corresponding charging stations LS1, LS2 are released for charging these electric vehicles FZ1, FZ2. In this case, the calculation arrangement BA calculates the waiting times tw1, tw2, tw3, tw4, tw5, tw6, tw7, tw8 on the basis of the following equations:

$$tw1=tf11-ta11; tw2=tf12-ta11;$$

$$tw3=tf21-ta12; tw4=tf22-ta12;$$

$$tw5=tf11-ta21; tw6=tf12-ta21;$$

$$tw7=tf21-ta22; tw8=tf22-ta22.$$

In this case, the waiting time tw1 is the interval of time between a likely release time tf11 of one of the two charging connections of one of the two charging stations LS1 and a likely arrival time ta11 of one of the two electric vehicles FZ1 at this charging station LS1. In a similar manner, the waiting time tw6 is the interval of time between a likely release time tf12 of one of the two charging connections of the further charging station LS2 and a likely arrival time ta21 of the further electric vehicle FZ2 at this charging station LS2.

If the corresponding waiting time tw1, tw2, tw3, tw4, tw5, tw6, tw7 or tw8 is greater than 0 (zero), the corresponding electric vehicle FZ1, FZ2 at the corresponding charging station LS1, LS2 must first of all wait until it can be charged at the corresponding charging connection of the respective charging station LS1, LS2. In contrast, if the corresponding waiting time tw1, tw2, tw3, tw4, tw5, tw6, tw7 or tw8 is less than or equal to 0 (zero), the corresponding electric vehicle FZ1, FZ2 can be immediately connected to the corresponding charging connection and can be charged by the latter if it reaches the corresponding charging station LS1, LS2.

Finally, the calculation arrangement BA forwards the calculated waiting times tw1, tw2, tw3, tw4, tw5, tw6, tw7, tw8 to the downstream decision-making arrangement EA.

The decision-making arrangement EA compares the waiting times tw1, tw2, tw3, tw4, tw5, tw6, tw7, tw8 with one another and, according to a further method step S320 and with regard to the energy requirements which are received by the decision-making arrangement EA from the vehicle second determination arrangements EA21, EA22 via the vehicle and coordination-point transmitting/receiving arrangements SA21, SA22, SA3, decides which of the electric vehicles FZ1, FZ2 are intended to approach which of the charging stations LS1, LS2 for charging. For this purpose, the decision-making arrangement EA considers the respective required waiting times tw1, tw2, tw3, tw4, tw5, tw6, tw7, tw8 at the respective charging stations LS1, LS2 and the corresponding energy requirements of the respective electric vehicles FZ1, FZ2 in order to reach the corresponding charging stations LS1, LS2 and makes the decision which is the most efficient from an economic and ecological point of view.

On the basis of the previously made decision and according to a further method step S330, the decision-making arrangement EA then transmits data, for example addresses, relating to the corresponding charging stations LS1, LS2, which are intended to be approached by the electric vehicles FZ1, FZ2 for charging, to the respective vehicle navigation arrangements NA1, NA2 with the aid of the coordination-point transmitting/receiving arrangement SA3.

If the vehicle navigation arrangements NA1, NA2 receive the data relating to the corresponding charging stations LS1, LS2 from the coordination-point transmitting/receiving arrangement SA3, they automatically input the received data, for example the addresses, relating to the corresponding charging stations LS1, LS2 into the driving routes R1, R2 of the respective electric vehicles FZ1, FZ2 as intermediate destinations according to a further method step S260.

The electric vehicles FZ1, FZ2 then drive—possibly after confirmation by the corresponding drivers—to the corresponding charging stations LS1, LS2 for charging.

The invention claimed is:

1. A method for charging a plurality of motor vehicles, at a plurality of public charging stations comprising:
   determining release times at which the respective charging stations are released for charging;
   determining arrival times at which the respective motor vehicles can arrive at the respective charging stations;
   calculating intervals of time between the respective determined release times and the respective determined arrival times as required waiting times for charging the respective motor vehicles at the respective charging stations;
   determining energy requirements of the respective motor vehicles for approaching the respective charging stations;
   comparing the determined energy requirements with one another; and
   deciding, on the basis of the calculated waiting times and on the basis of the comparing of the determined energy requirements, which of the charging stations will be approached by the respective motor vehicles for charging, with the proviso that an actual total waiting time, which forms a sum of actual waiting times for charging the respective motor vehicles at the respective charging stations, is minimized.

2. The method as claimed in claim 1, further comprising:
   determining ranges of the respective motor vehicles;
   wherein the deciding step also provides for a decision to be made, on the basis of the determined ranges, as regards which of the charging stations will be approached by the respective motor vehicles for charging.

3. The method as claimed in claim 1, further comprising:
   determining possible driving routes to destinations which have to be approached by the respective motor vehicles;
   wherein the deciding step also provides for a decision to be made, on the basis of the determined driving routes, as regards which of the charging stations will be approached by the respective motor vehicles for charging.

4. The method as claimed in claim 1, wherein the motor vehicles are hybrid electric/electric vehicles.

5. A system for charging a plurality of motor vehicles, at a plurality of public charging stations, comprising:
   at least one first determination arrangement for determining release times at which the respective charging stations are released for charging;
   at least one second determination arrangement for determining arrival times at which the respective motor vehicles can arrive at the respective charging stations;
   at least one calculation arrangement for calculating intervals of time between the respective determined release times and the respective determined arrival times as required waiting times for charging the respective motor vehicles at the respective charging stations;
   at least one third determination arrangement for determining energy requirements of the respective motor vehicles for approaching the respective charging stations;
   at least one comparison arrangement for comparing the determined energy requirements with one another; and
   a decision-making arrangement for deciding, on the basis of the calculated waiting times and on the basis of the comparing of the determined energy requirements, which of the charging stations will be approached by the respective motor vehicles for charging.

6. The system as claimed in claim 5, wherein the motor vehicles are hybrid electric/electric vehicles.

* * * * *